United States Patent Office 3,105,046
Patented Sept. 24, 1963

3,105,046
INHIBITED DRILLING MUD
Paul W. Fischer, Whittier, Calif., assignor to Union Oil Company of California, Los Angeles, Calif., a corporation of California
No Drawing. Filed Jan. 30, 1961, Ser. No. 85,514
10 Claims. (Cl. 252—8.5)

This invention relates to aqueous base drilling fluids and in particular relates to aqueous base drilling fluids which do not readily hydrate water swellable formations.

In the rotary drilling of subterranean oil wells, a drilling fluid is circulated down the drill string and up the annulus between the well bore and drill pipe. As this fluid passes out the lower end of the drill string it cools and lubricates the drill bit, removes cuttings therefrom, and carries them to the earth's surface. These cuttings are removed from the fluid at the surface and the fluid is treated and recirculated. During the drilling some of the drilling fluid seeps into the formation, depositing its suspended solids on the well bore wall in the form of a mud cake which seals the wall.

In some localities, particularly in the gulf coast area, formations are frequently encountered which contain easily hydratable clays and shales which swell and disintegrate upon contact with water. This is extremely troublesome because when contacted with water from the drilling fluid, the walls of the well bore often collapse and cave into the bore hole resulting in cavities and enlargements in the well bore which interfere with subsequent operations. Often the collapse of the shale causes the drill string to stick and sometimes makes further drilling impossible.

It has been suggested that various materials, such as sodium chloride, gypsum, lime, calcium chloride, etc., be incorporated in the drilling fluid to eliminate this difficulty, but while these materials are satisfactory in many instances, they are not entirely effective with respect to very readily hydratable formations such as are encountered in the gulf coast, Venezuela, Costa Rica, etc.

I have found that the hydration of swellable clays, heaving shale, etc., can be greatly reduced by adding to the drilling fluid an alkali metal or ammonium sulfonate of intermediate molecular weight. The sulfonate can be an alkyl or alkylated benzene or naphthalene sulfonate. These agents and their availability are hereinafter discussed in detail.

Referring more particularly to the aqueous drilling fluids to which the invention applies, any of the commonly employed aqueous and water external emulsion base drilling fluids can be used. Conventionally, such fluids comprise fresh or salt water, clay, one or more fluid loss agents, and optionally, weighting materials and miscellaneous additives such as thinning agents, bactericides, etc. The water external emulsion base drilling fluids also contain between about 5 and 80 percent of a hydrocarbon oil dispersed in the water. The hydrocarbon oil can be a crude petroleum, a distillate, a residuum or a blend of virgin and cracked stocks. Usually such oil will have a gravity between about 12° and about 40° API and a viscosity between 30 SUS at 100° F. and 110 SSF at 122° F. Various oil-in-water emulsifiers can be employed to disperse the oil such as the rosin derivatives, e.g., Dressinate 90; polyalkylene polyamine emulsifiers; alkali metal soaps of fatty acids, etc. The selection and formulation of the oil and the oil-in-water emulsifier based on their chemical and physical properties is well understood by those skilled in the art.

Between about 10 to 250 pounds of clay per barrel of drilling fluid is employed to impart viscosity and thixotropicity to the water so that the cuttings can be suspended in the fluid while in the well bore, yet be separated from the fluid at the earth's surface. Various clays can be employed for this, e.g., local clay or commercially available clays such as bentonite, illites, beidellite, attapulgite, etc.

To prevent excessive water seepage and loss due to the formation which would thereby render the drilling fluid unsuitable, between about 0.1 to 10 pounds of a fluid loss additive per barrel of drilling fluid is employed. The most common of such additives are sodium carboxymethyl cellulose, hydrolyzed polyacrylonitrile and starch. Other materials, such as the natural gums, e.g., arabic, tragacanth, karaya, locust bean, egyptian gum, etc., can also be used.

Since densities greater than the normal aqueous clay suspension, e.g., densities greater than about 20 pounds per gallon, are sometimes needed, particularly when drilling relatively deep holes or where high formation pressures are encountered, it is common practice to employ weighting agents in amounts between about 10 to 1000 pounds per barrel of drilling fluid and sufficient to impart the desired density to the composition. Typical of the weighting agents which are used to obtain such densities are barites, iron oxide, calcium carbonate, celestite, tripoli, etc.

Because the clay often renders the water too viscous, or because the drilling fluid becomes excessively viscous upon use, various thinning agents in amounts between about 0.1 to 15 pounds per barrel are frequently employed to reduce its viscosity. Among such agents are tannin extracts such as chestnut extract, plant tannin, quebracho extract, etc.; lignins or humic acids; alkali and alkaline-earth lignosulfonates; and molecularly dehydrated phosphates. When the drilling fluids contain calcium salts, e.g., gypsum as antihydration agents, the molecularly dehydrated phosphates are not preferred as thinning agents because of their tendency to precipitate calcium phosphates.

When the fluid comprises an organic material such as starch or humus, bactericides are frequently employed in minor amounts to prevent fermentation. Typical of such bactericides are: paraformaldehyde, lime and salt in high concentrations and limited amounts of quaternary salts.

As previously mentioned, salts of the alkali and alkaline-earth metals have been employed in amounts between about 1 and about 20 pounds per barrel of drilling fluid to reduce the hydration of clays and shales which are encountered during the drilling operation. Typical of such are sodium chloride, calcium chloride, gypsum, calcium acetate, etc. These materials can also be employed in the drilling fluids of my invention to increase their hydration inhibition. The aforementioned class of alkali metal or ammonium sulfonates when employed in accordance with my invention are highly effective as the sole hydration inhibitor.

The surface active agents which I have found to be effective in substantially eliminating hydration of clays and heaving shales belong to the alkali metal or ammonium sulfonate class of organic compounds corresponding to the general formula:

$$RSO_3M$$

wherein the $RSO_3$ group is selected from the group consisting of alkyl, alkylated benzene, alkylated naphthalene sulfonates and mixtures thereof; the total of the carbon atoms in the R group is between about 11 and 19; and, M is selected from the group consisting of ammonium, alkali metals, and water soluble primary, secondary and tertiary alkyl and alkanol amines.

In general, the water solubility of the amines depends on the total of the carbon atoms included as well as the presence of hydroxyl group. For alkyl amines the maximum limit to water solubility is about 8 carbons atoms, whereas for the alkanol amines the upper limit is about 12 carbon atoms.

Representative of organic sulfonates useful in my invention are the following: alkyl sulfonates; potassium undecane sulfonate, sodium butyl nonane sulfonate, dimethyl amine pentadecane sulfonate, sodium ethyl pentadecane sulfonate, potassium nonadecane sulfonate, etc.;

Alkylated benzene sulfonates; sodium amyl benzene sulfonate, potassium isohexyl benzene sulfonate, triethanol amine octyl benzene sulfonate, ammonium decyl benzene sulfonate, sodium dodecyl benzene sulfonate, etc.; and Alkylated naphthalene sulfonates; sodium methyl naphthalene sulfonate, methyl amine isopropyl naphthalene sulfonate, sodium amyl naphthalene sulfonate, ammonium heptyl naphthalene sulfonate, sodium nonyl naphthalene sulfonate, etc.

These agents I have found effective in concentrations between about 2 and about 10 pounds per barrel, preferably between about 4 and 7 pounds per barrel.

The preparation of these materials is well known in the art and therefore will only be briefly discussed. In general, the aromatic nucleus is more readily sulfonated than are the alkyl groups. With the aromatics, i.e., benzene or naphthalene, sulfonation is conducted by the action of concentrated sulfuric acid on the aromatic. Although the reaction proceeds even at ambient temperatures, it is preferred to employ elevated temperatures and/or subatmospheric pressures to remove the water formed in the reaction and thereby prevent dilution of the sulfuric acid. Suitably, excess sulfuric acid having a strength of at least 65 percent is used at about 175° C. The sulfonic acid so formed can be separated by addition of an alkali metal salt, e.g., sodium, potassium, lithium halides, sulfates, nitrates, etc., to the reaction media. Upon addition of the alkali metal salt, the alkali metal sulfonate crystallizes from the liquor. Alkali metal sulfonates of suitable aromatic radicals are commercially available and the following are examples of these materials: "Santomerse 1," sodium lauryl benzene sulfonate, marketed by the Monsanto Chemical Company; "Sorbit AC," a mixture of mono- and dibutyl substituted naphthalene sodium sulfonates, marketed by the Alrose Chemical Company.

The alkyl sulfonates can be prepared by sulfonation of the paraffin hydrocarbon, however this procedure is difficult. The alkyl sulfonates are more readily prepared by nitric acid oxidation of mercaptans or by alkylation of sulfites. An example of a suitable and commercially available alkali metal alkyl sulfonate is "Mersolate," sodium pentadecane sulfonate.

EXAMPLE 1

To determine the hydration inhibiting effect of various non-ionic wetting agents, the following test procedure was employed:

To simulate the aqueous filtrate which seeps into the reservoir during drilling operations, a polyacrylic amide was dissolved in ocean water at a concentration of about 3 pounds per barrel. The surface active agent to be tested was dissolved in this solution at a concentration of about 7 pounds per barrel. A five-gram core of a readily hydratable clay (Costa Rican) was then added to two hundred milliliters of the resultant solution at room temperature and the time for the core to disintegrate was observed. Alkali metal and ammonium sulfonates of various organic substituents were tested and the results are summarized in the following table:

*Table 1*

| Sample | Stability of core; time to disintegrate (minutes) | Surface Active Agent | $RSO_3$ Weight |
|---|---|---|---|
| 1 | 15 | Mixture of $C_8$–$C_{10}$ sodium alkyl sulfonates. | about 210. |
| 2 | 15 | Sodium sulfonate of a naphthalene condensate. | greater than 350. |
| 3 | 3,900 | Mixture of mono- and dibutyl naphthalene sodium sulfonate. | about 290. |
| 4 | 5 | High molecular weight alkyl aryl sodium sulfonate from petroleum mahogany acids. | average about 450. |
| 5 | 3,900 | Lauryl benzene sodium sulfonate. | 325. |
| 6 | 3,900 | Alkyl aryl amine sulfonate. | about 300. |
| 7 | 5 | None. | |

EXAMPLE 2

To determine the effect of the organic sulfonates on drilling muds, a base fluid was prepared having the following composition.

| Ingredient: | Parts by weight |
|---|---|
| Ocean water | 350 |
| Native Californian clay (Rogers Lake) | 100 |
| Attapulgite clay | 8 |
| Starch | 5 |
| Ferro chrome metal lignosulfonate (Q-Broxin [1]) | 6 |
| Sodium hydroxide | 2 |

[1] Baroid Mud Company.

To separate samples of the base fluid were added an alkyl naphthalene sodium sulfonate having a molecular weight of about 280 units and an alkyl benzene ammonium sulfonate having a molecular weight of about 300 units. The additives were employed at a concentration of 7 pounds per barrel. The samples were stirred at 3400 r.p.m. for 5 minutes and then transferred to pressure vessels which were clamped into a rotor in an oven at 400° F. and rotated or tumbled for 16 hours. At the end of this period the samples were withdrawn and tested by a standard API test method for fluid loss and the fan viscosometer for viscosity and gel strength. A filtrate was obtained from each sample and tested for hydration inhibition at room temperature by placing a five-gram sample of an easily hydratable core of gulf coast origin into a two hundred milliliter sample of the filtrate. After 4 days, the immersed core was inspected and the percent of its original volume recorded. Since cores placed in water completely disintegrated within this period, the percent of the original volume remaining after four days was recorded as the percent hydration inhibition. The following table summarizes the results:

*Table 2*

| Inhibitor | Inhibition, Percent of Original | Drilling Fluid Properties | | | | |
|---|---|---|---|---|---|---|
| | | Fan Visc., sec. | | Fan gel strength | | Fluid Loss, Ml./30 min. |
| | | 600 r.p.m. | 300 r.p.m. | Initial | 10 min. | |
| Sodium alkyl naphthalene sulfonate | 90 | 45 | 30 | 10 | 13 | 4.0 |
| Sodium alkyl benzene sulfonate | 75 | 46 | 35 | 15 | 18 | 8.8 |

EXAMPLE 3

A second base fluid was prepared, identical to that described in Example 2 except a sodium salt of polyacrylic amide ("Cypan," marketed by American Cyanamid Company) was substituted for the starch employed in Example 2. An alkyl benzene ammonium sulfonate having a molecular weight of about 300 units was added to the base fluid and the procedure of Example 2 repeated. The following results were obtained.

*Table 3*

| | |
|---|---|
| Stability of core after 4 days | 75 percent of original volume. |
| Fan viscosity: | |
| 600 r.p.m | 44 seconds. |
| 300 r.p.m | 30 seconds. |
| Fan gel strength: | |
| Initial | 4 lbs./square foot. |
| 10 minutes | 10 lbs./square foot. |
| Fluid loss | 42 ml. per 30 min. |

The following compositions of drilling fluids are illustrative of my invention.

FRESH WATER FLUID (75 LBS. PER CUBIC FOOT)

| Component: | Parts by weight |
|---|---|
| Native Californian clay (Rogers Lake) | 114 |
| Water | 300 |
| Bentonite | 10 |
| Quebracho | 0.5 |
| Sodium salt of polyacrylic acid (Cypan [1]) | 0.3 |
| Sodium pentadecane sulfonate | 7.0 |
| | 431.8 |

[1] American Cyanamid Company.

OCEAN WATER FLUID (77 LBS. PER CUBIC FOOT)

| Component: | |
|---|---|
| Sodium hydroxide | 2 |
| Native Californian clay (Rogers Lake) | 100 |
| Ocean water | 307 |
| Attapulgite | 8 |
| Ferro chrome lignosulfonate (Q-Broxin [1]) | 6 |
| Sodium carboxymethyl cellulose | 4 |
| Sodium dibutyl naphthalene sulfonate | 6 |
| | 433 |

[1] Baroid Mud Company.

WEIGHTED OCEAN WATER MUD (131 LBS. PER CUBIC FOOT)

| Component: | |
|---|---|
| Ocean water | 350 |
| Native Californian clay (Rogers Lake) | 100 |
| Attapulgite clay | 8 |
| Starch | 5 |
| Ferro chrome lignosulfonate (Q-Broxin) | 6 |
| Sodium hydroxide | 2 |
| Barites | 500 |
| Potassium dodecyl xylene sulfonate | 6 |
| | 977 |

GYPSUM FLUID (117 LBS. PER CUBIC FOOT)

| Component: | |
|---|---|
| Attapulgite | 6.2 |
| Fresh water | 272 |
| Ferro chrome lignosulfonate (Q-Broxin) | 3.1 |
| Native Californian clay (Rogers Lake) | 58 |
| Cypan | 1.5 |
| Sodium hydroxide | 1.5 |
| Barites | 310 |
| Gypsum | 7 |
| Sodium amyl naphthalene sulfonate | 5.4 |
| | 663.2 |

The preceding examples are presented solely to illustrate compositions of my invention and to set forth the properties which can be obtained by these fluids. They are not to be construed as unduly limiting of my invention which comprises the compositions of materials or their obvious equivalents as set forth in the following claims.

I claim:

1. A drilling fluid comprising an aqueous suspension of a clay and between about 2 and about 10 pounds per barrel of a clay hydration inhibiting agent, said agent having the general formula:

$$RSO_3M$$

wherein the $RSO_3$ group is selected from the group consisting of alkyl, alkylated benzene, alkylated naphthalene sulfonates and mixtures thereof;
the total carbon atoms in said R group is between 11 and 19; and
M is selected from the group consisting of ammonium, alkali metals and water soluble primary, secondary and tertiary alkyl and alkanol amines.

2. A drilling fluid comprising fresh water, between about 10 to 250 pounds per barrel of clay, between about 1 to 20 pounds per barrel of gysum, and between 2 to 10 pounds per barrel of a clay hydration inhibiting agent, said agent having the general formula:

$$RSO_3M$$

wherein the $RSO_3$ group is selected from the group consisting of alkyl, alkylated benzene, alkylated naphthalene sulfonates and mixtures thereof;
the total carbon atoms in said R group is between 11 and 19; and
M is selected from the group consisting of ammonium, alkali metals and water soluble primary, secondary and tertiary alkyl and alkanol amines.

3. The drilling fluid of claim 2 which also contains between about 0.1 to 15 pounds per barrel of a thinning agent.

4. The drilling fluid of claim 2 which also contains between about 0.1 to 15 pounds per barrel of a fluid loss agent.

5. The drilling fluid of claim 2 which also contains between 10 to 600 pounds per barrel of a weighting agent.

6. An ocean water drilling fluid comprising ocean water and between about 10 to 250 pounds per barrel of clay and between about 2 to 10 pounds per barrel of a clay hydration inhibiting agent, said agent having the general formula:

$$RSO_3M$$

wherein the $RSO_2$ group is selected from the group consisting of alkyl, alkylated benzene, alkylated naphthalene sulfonates and mixtures thereof;
the total carbon atoms in said R group is between 11 and 19; and
M is selected from the group consisting of ammonium, alkali metals and water soluble primary, secondary and tertiary alkyl and alkanol amines.

7. The drilling fluid of claim 6 which also contains between about 0.1 to 15 pounds per barrel of a thinning agent.

8. The drilling fluid of claim 6 which also contains between about 0.1 to 15 pounds per barrel of a fluid loss agent.

9. The drilling fluid of claim 6 which also contains between 10 to 600 pounds per barrel of a weighting agent.

10. A drilling fluid comprising water, clay, a thinning agent, a fluid loss agent, oil emulsified as the discontinuous phase and a shale hydration inhibiting agent, said clay being present in an amount between about 10 and 250 pounds per barrel, the thinning agent and fluid loss agent each being present in an amount between about 0.1 and 15 pounds per barrel, and said clay hydration inhibiting agent being present in an amount between about 2 and 10 pounds per barrel, said agent having the general formula:

$$RSO_3M$$

wherein the $RSO_3$ group is selected from the group consisting of alkyl, alkylated benzene, alkylated naphthalene sulfonates and mixtures thereof;
the total carbon atoms in said R group is between 11 and 19; and
M is selected from the group consisting of ammonium, alkali metals and water soluble primary, secondary and tertiary alkyl and alkanol amines.

References Cited in the file of this patent

UNITED STATES PATENTS

| | | |
|---|---|---|
| 2,568,992 | Doscher | Sept. 25, 1951 |
| 2,857,328 | Fischer | Oct. 21, 1958 |
| 2,935,473 | King et al. | May 3, 1960 |

FOREIGN PATENTS

| | | |
|---|---|---|
| 803,544 | Great Britain | Oct. 29, 1958 |
| 576,739 | Canada | May 26, 1959 |